(12) United States Patent
Xiao et al.

(10) Patent No.: US 11,784,728 B2
(45) Date of Patent: Oct. 10, 2023

(54) RADIO FREQUENCY CHANNEL CALIBRATION METHOD AND APPARATUS, ANTENNA, AND BASE STATION

(71) Applicant: Huawei Technologies Co., Ltd., Shenzhen (CN)

(72) Inventors: Weihong Xiao, Dongguan (CN); Linlin Wang, Xi'an (CN); Lanping Gong, Dongguan (CN); Lei Chen, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 17/388,872

(22) Filed: Jul. 29, 2021

(65) Prior Publication Data

US 2021/0391929 A1 Dec. 16, 2021

Related U.S. Application Data

(63) Continuation of application No. PCT/CN2020/072465, filed on Jan. 16, 2020.

(30) Foreign Application Priority Data

Jan. 30, 2019 (CN) .......................... 201910094297.5

(51) Int. Cl.
    *H04B 17/21* (2015.01)
    *H01Q 1/24* (2006.01)
    *H01Q 21/00* (2006.01)

(52) U.S. Cl.
    CPC ............. *H04B 17/21* (2015.01); *H01Q 1/246* (2013.01); *H01Q 21/0006* (2013.01)

(58) Field of Classification Search
    CPC ...... H01Q 1/246; H01Q 21/0006; H01Q 3/26; H01Q 3/267; H04B 17/11; H04B 17/12; H04B 17/21; H04B 17/22; H04B 17/221
    See application file for complete search history.

(56) References Cited

U.S. PATENT DOCUMENTS

| | | | | |
|---|---|---|---|---|
| 6,236,839 B1 * | 5/2001 | Gu | ......................... | H01Q 3/267 342/359 |
| 6,806,844 B2 * | 10/2004 | Azuma | ................ | H04B 17/327 455/67.11 |
| 8,320,903 B2 * | 11/2012 | Ding | ................... | H04W 88/085 342/368 |

(Continued)

FOREIGN PATENT DOCUMENTS

| | | |
|---|---|---|
| CN | 1859031 A | 11/2006 |
| CN | 102594426 A | 7/2012 |

(Continued)

*Primary Examiner* — Jason Crawford
(74) *Attorney, Agent, or Firm* — Slater Matsil, LLP

(57) ABSTRACT

An antenna includes: at least three radio frequency interfaces and a feed network, where each of the radio frequency interfaces is connected to a radio frequency channel between the radio frequency interface and a RRU. A first interface is configured to receive a signal from the RRU, and transmit the signal to a second interface by using the feed network. The second interface is configured to send the signal to the RRU. The feed network includes a main feed circuit, a calibration signal circuit, and a switch. The calibration signal circuit is configured to transmit a calibration signal from the first interface to the second interface, where the calibration signal is used to calibrate a phase and an amplitude of the radio frequency channel connected to the first interface. The switch is configured to isolate the calibration signal from a signal on the main feed circuit.

15 Claims, 7 Drawing Sheets

(56) References Cited

U.S. PATENT DOCUMENTS

| | | | |
|---|---|---|---|
| 10,320,464 B2 | 7/2019 | Chen et al. | |
| 10,812,159 B2* | 10/2020 | Huang | H04B 7/08 |
| 11,177,567 B2* | 11/2021 | Khalil | H04B 17/21 |
| 2004/0171408 A1* | 9/2004 | Maruta | H04B 17/14 |
| | | | 342/359 |
| 2008/0285637 A1* | 11/2008 | Liu | H01Q 3/267 |
| | | | 375/267 |
| 2011/0134972 A1* | 6/2011 | Zhu | H04B 17/21 |
| | | | 375/219 |
| 2012/0208584 A1* | 8/2012 | Liao | H04B 17/12 |
| | | | 455/509 |
| 2012/0252366 A1* | 10/2012 | Aoki | H04B 7/0617 |
| | | | 455/67.11 |
| 2012/0299769 A1* | 11/2012 | Li | H01Q 3/267 |
| | | | 342/174 |
| 2013/0260844 A1* | 10/2013 | Rucki | H01Q 3/2605 |
| | | | 455/575.7 |
| 2015/0200740 A1* | 7/2015 | Yi | H04L 5/006 |
| | | | 370/328 |
| 2015/0255868 A1* | 9/2015 | Haddad | H04B 17/12 |
| | | | 342/368 |
| 2016/0020817 A1* | 1/2016 | Chen | H04B 1/56 |
| | | | 370/278 |
| 2016/0099762 A1* | 4/2016 | Wu | H04B 7/0456 |
| | | | 370/329 |
| 2016/0294488 A1* | 10/2016 | Sun | H04B 17/14 |
| 2017/0077602 A1* | 3/2017 | Li | H01Q 5/22 |
| 2017/0250765 A1 | 8/2017 | Hasarchi et al. | |
| 2020/0014105 A1* | 1/2020 | Braun | H01Q 3/267 |
| 2021/0391929 A1* | 12/2021 | Xiao | H01Q 3/267 |

FOREIGN PATENT DOCUMENTS

| | | |
|---|---|---|
| CN | 104243055 A | 12/2014 |
| CN | 106330350 A | 1/2017 |
| CN | 107483125 A | 12/2017 |
| CN | 107547146 A | 1/2018 |
| EP | 3565134 A1 | 11/2019 |
| WO | 2014026558 A1 | 2/2014 |
| WO | 2018137148 A1 | 8/2018 |

* cited by examiner

RADIO FREQUENCY CHANNEL CALIBRATION METHOD AND APPARATUS, ANTENNA, AND BASE STATION

CROSS-REFERENCE TO RELATED APPLICATIONS

This application is a continuation of International Application No. PCT/CN2020/072465, filed on Jan. 16, 2020, which claims priority to Chinese Patent Application No. 201910094297.5, filed on Jan. 30, 2019. The disclosures of the aforementioned applications are hereby incorporated by reference in their entireties.

TECHNICAL FIELD

This application relates to communications technologies, and in particular, to a radio frequency channel calibration method and apparatus, an antenna, and a base station.

BACKGROUND

With rapid development of wireless communication, a base station antenna presents a multi-port and diversified development trend. In an antenna technology including multiple-input multiple-output (MIMO), beamforming (BF), and massive MIMO (MM), a phase and an amplitude of a radio frequency channel of a base station need to be calibrated for an intelligent beam feature.

Currently, a dedicated calibration channel may be added between an antenna and a remote radio unit (RRU) to calibrate the phase and the amplitude of the radio frequency channel.

However, the foregoing technology cannot be compatible with a currently deployed RRU without a dedicated calibration channel, and a dedicated calibration channel needs to be added. As a result, deployment costs are increased.

SUMMARY

This application provides a radio frequency channel calibration method and apparatus, an antenna, and a base station, to reduce interference of a signal on a main feed circuit to a calibration signal, ensure correctness of a calibration result, and be compatible with various RRU devices.

According to a first aspect, this application provides an antenna, including: at least three radio frequency interfaces and a feed network disposed among the at least three radio frequency interfaces, where each of the at least three radio frequency interfaces is connected to one radio frequency channel between the radio frequency interface and an RRU. A first interface is configured to receive a signal from the RRU, and transmit the signal to a second interface by using the feed network. The second interface is configured to send the signal to the RRU. The second interface is one of the at least three radio frequency interfaces, and the first interface is one of the at least three radio frequency interfaces except the second interface. The feed network includes a main feed circuit, a calibration signal circuit, and a switch. The calibration signal circuit is configured to transmit a calibration signal from the first interface to the second interface, where the calibration signal is used to calibrate a phase and an amplitude of the radio frequency channel connected to the first interface. The switch is configured to isolate the calibration signal from a signal on the main feed circuit.

In this application, by adding the switch to the feed network between the antenna and the RRU, other radio frequency channels in the antenna can be calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

In a possible implementation, the switch is disposed on the main feed circuit. When the switch is a space switch, the space switch isolates the calibration signal from the signal on the main feed circuit by turning off the main feed circuit. Alternatively, when the switch is a time switch, the time switch isolates the calibration signal from the signal on the main feed circuit by increasing a delay of the signal on the main feed circuit. Alternatively, when the switch is a frequency switch, the frequency switch isolates the calibration signal from the signal on the main feed circuit by changing a frequency of the signal on the main feed circuit.

In this application, by adding the switch to the main feed circuit in the feed network between the antenna and the RRU, other radio frequency channels in the antenna can be calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

In a possible implementation, the switch is disposed on the calibration signal circuit. When the switch is a space switch, the space switch first turns off the calibration signal circuit to obtain the signal on the main feed circuit, then connects to the calibration signal circuit to obtain a mixed signal of the calibration signal and the signal on the main feed circuit, and finally isolates the calibration signal from the signal on the main feed circuit by using the mixed signal and the signal on the main feed circuit. Alternatively, when the switch is a time switch, the time switch isolates the calibration signal from the signal on the main feed circuit by increasing a delay of the calibration signal. Alternatively, when the switch is a frequency switch, the frequency switch isolates the calibration signal from the signal on the main feed circuit by changing a frequency of the calibration signal.

In this application, by adding the switch to the calibration signal circuit in the feed network between the antenna and the RRU, other radio frequency channels in the antenna are calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

In a possible implementation, at least two couplers are further disposed on the calibration signal circuit. A first coupler is configured to couple the calibration signal from the main feed circuit to the calibration signal circuit, and the first coupler is one of the at least two couplers. A second coupler is configured to couple the calibration signal from the calibration signal circuit to the main feed circuit, and the second coupler is one of the at least two couplers except the first coupler.

According to a second aspect, this application provides a base station, including an antenna and a remote radio unit RRU. The antenna is the antenna according to any one of the first aspect. There are at least three radio frequency channels between the RRU and the antenna, where a first channel is a radio frequency channel connected to a first interface in the antenna, and a second channel is a radio frequency channel connected to a second interface in the antenna. The second channel is one of the at least three radio frequency channels, and the first channel is one of the at least three radio frequency channels except the second channel.

In a possible implementation, when there is one RRU, the first channel and the second channel are separately connected to different radio frequency interfaces of the RRU. Alternatively, when there are at least two RRUs, the first channel and the second channel are separately connected to different radio frequency interfaces of different RRUs.

According to a third aspect, this application provides a radio frequency channel calibration method, where the method is applied to the base station according to the second aspect, and the method includes: transmitting, through at least two first channels, a calibration signal to a first interface connected to each of the at least two first channels in an antenna; isolating the calibration signal from a signal on a main feed circuit, and transmitting the calibration signal to a second interface; receiving the calibration signal through a second channel connected to the second interface; and obtaining compensation information for phases and amplitudes of the at least two first channels based on the received calibration signal.

In this application, other radio frequency channels in the antenna are calibrated by using one existing radio frequency channel between the antenna and an RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various types of RRUs.

In a possible implementation, the at least two first channels and the second channel are separately radio frequency channels between different radio frequency interfaces on a same RRU and a radio frequency interface of the antenna. Alternatively, the at least two first channels and the second channel are separately radio frequency channels between radio frequency interfaces on different RRUs and a radio frequency interface of the antenna.

According to a fourth aspect, this application provides a radio frequency channel calibration apparatus, where the apparatus is disposed on the base station according to the second aspect, and the apparatus includes: a transmission module, configured to transmit, through at least two first channels, a calibration signal to a first interface connected to each of the at least two first channels in an antenna; an isolation module, configured to isolate the calibration signal from a signal on a main feed circuit, and transmit the calibration signal to a second interface; a receiving module, configured to receive the calibration signal through a second channel connected to the second interface; and a calibration module, configured to obtain compensation information for phases and amplitudes of the at least two first channels based on the received calibration signal.

In a possible implementation, the at least two first channels and the second channel are separately radio frequency channels between different radio frequency interfaces on a same RRU and a radio frequency interface of the antenna. Alternatively, the at least two first channels and the second channel are separately radio frequency channels between radio frequency interfaces on different RRUs and a radio frequency interface of the antenna.

According to a fifth aspect, this application provides a computer-readable storage medium. The computer-readable storage medium stores instructions, and when run on a computer, the instructions are used to perform the method according to any one of the third aspect.

According to a sixth aspect, this application provides a computer program. When executed by a computer, the computer program is used to perform the method according to any one of the third aspect.

DETAILED DESCRIPTION OF ILLUSTRATIVE EMBODIMENTS

To make objectives, technical solutions, and advantages of this application clearer, the following clearly describes the technical solutions in this application with reference to the accompanying drawings in this application. Apparently, the described embodiments are merely a part rather than all of the embodiments of this application. All other embodiments obtained by persons of ordinary skill in the art based on the embodiments of this application without creative efforts shall fall within the protection scope of this application.

Figure 1:
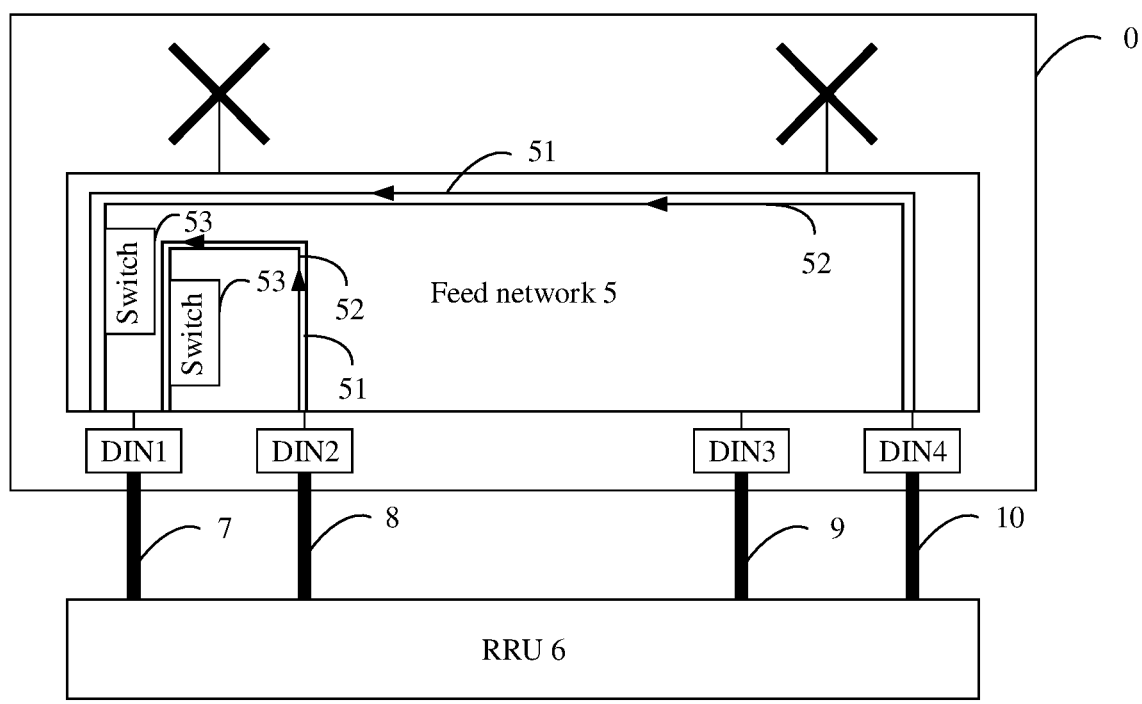
FIG. 1 is a schematic structural diagram of Embodiment 1 of an antenna according to this application.

FIG. 1 is a schematic structural diagram of Embodiment 1 of an antenna according to this application. As shown in FIG. 1, this application provides an antenna 0, which may include at least three radio frequency interfaces (for example, four radio frequency interfaces DIN1, DIN2, DIN3, and DIN4 are shown in the figure) and a feed network 5 disposed among the at least three radio frequency interfaces. Each of the at least three radio frequency interfaces is connected to one radio frequency channel between the radio frequency interface and an RRU 6 (for example, four radio frequency channels 7 to 10 are shown in the figure). The radio frequency channel 7 is a radio frequency channel between the RRU 6 and the radio frequency interface DIN1 in the antenna 0, the radio frequency channel 8 is a radio frequency channel between the RRU 6 and the radio frequency interface DIN2 in the antenna 0, the radio frequency channel 9 is a radio frequency channel between the RRU 6 and the radio frequency interface DIN3 in the antenna 0, and the radio frequency channel 10 is a radio frequency channel between the RRU 6 and the radio frequency interface DIN4 in the antenna 0. First interfaces (for example, DIN2 and DIN4) are configured to receive a signal from the RRU 6, and transmit the signal to a second interface (for example, DIN1) by using the feed network 5. The second interface (for example, DIN1) is configured to send the signal to the RRU. The feed network 5 includes a calibration signal circuit 51, a main feed circuit 52, and a switch 53. The calibration signal circuit 51 is configured to transmit a calibration signal from the first interface to the second interface (for example, the calibration signal circuits 51 between DIN4 and DIN1 and between DIN2 and DIN1 are shown in the figure, and directions of signal flows of the calibration signal circuits 51 are from DIN4 to DIN1 and from DIN2 to DIN1). The calibration signal is used to calibrate phases and amplitudes of radio frequency channels (for example, the radio frequency channels 10 and 8) connected to the first interface. The main feed circuit 52 is configured to transmit a main signal from the first interface to the second interface (for example, the main feed circuits 52 between DIN4 and DIN1 and between DIN2 and DIN1 are shown in the figure, and directions of signal flows of the main feed circuits 52 are from DIN4 to DIN1 and from DIN2 to DIN1). The switch 53 is configured to isolate the calibration signal from a signal on the main feed circuit. In this application, the switch 53 may be disposed on the main feed circuit or the calibration signal circuit (for example, the switch 53 disposed on the main feed circuit 52 is shown in the figure).

In this application, other radio frequency channels in the antenna are calibrated by using one existing radio frequency channel between the antenna and the RRU, so that phases and amplitudes of the other radio frequency channels are kept consistent. Therefore, to ensure correctness of the calibration, the calibration signal transmitted by the second interface to the RRU needs to be not interfered by other signals, especially, the signal on the main feed circuit. Therefore, in this application, the switch is disposed to isolate the calibration signal from the signal on the main feed circuit. In this application, by adding the switch to the feed network between the antenna and the RRU, other radio frequency channels in the antenna are calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

Several specific embodiments are used below to describe in detail the technical solution of the embodiment shown in FIG. 1.

Figure 2:
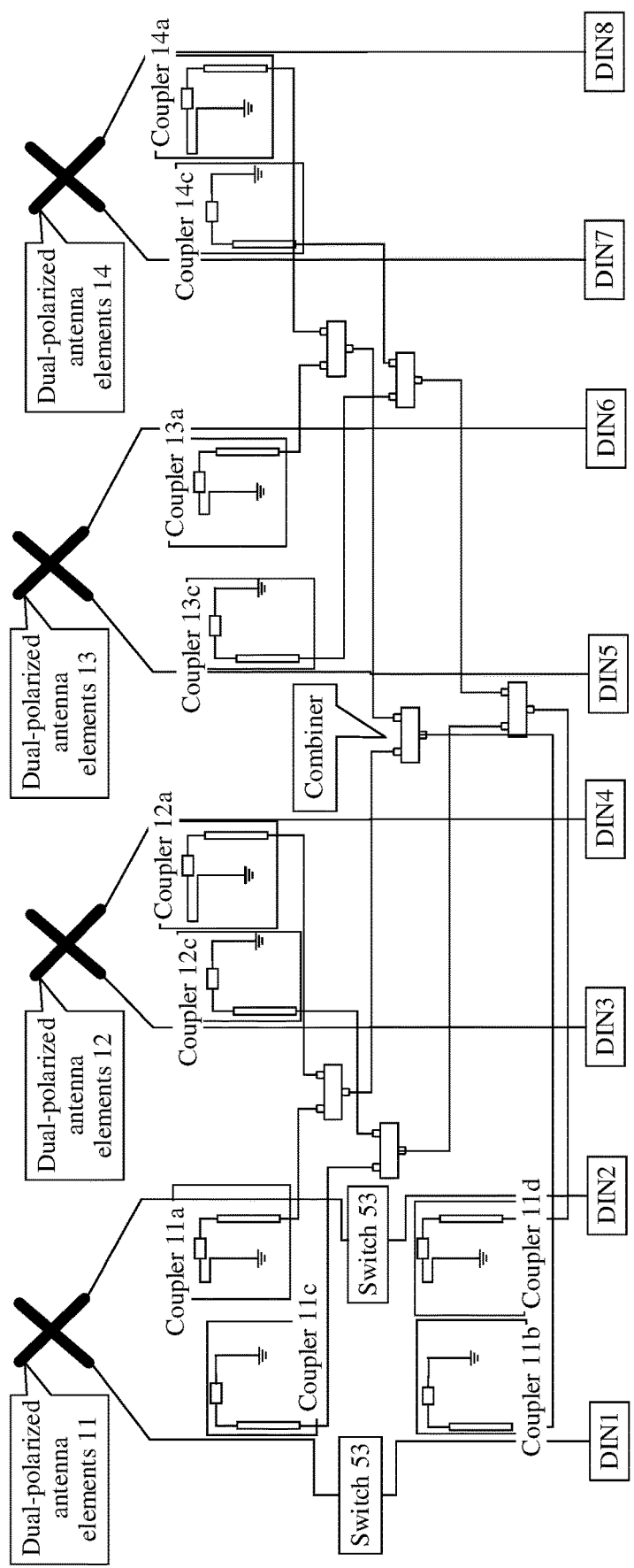
FIG. 2 and FIG. 3 are schematic structural diagrams of Embodiment 2 of an antenna according to this application.
Figure 3:
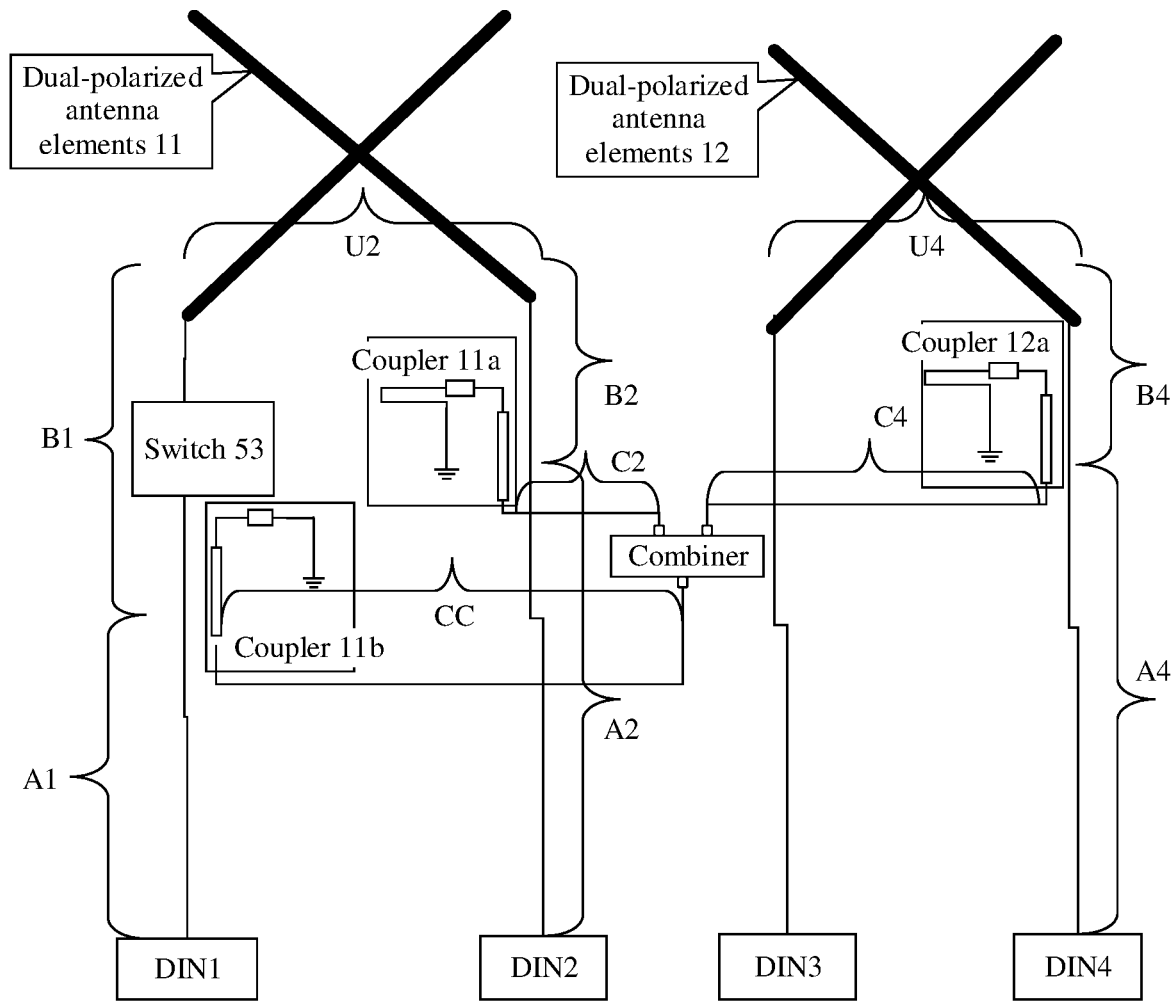

FIG. 2 and FIG. 3 are schematic structural diagrams of Embodiment 2 of an antenna according to this application. As shown in FIG. 2, this application provides an antenna, including four groups of dual-polarized antenna elements, and each group of dual-polarized antenna elements is connected to two radio frequency interfaces. To be specific, the dual-polarized antenna elements 11 are connected to radio frequency interfaces DIN1 and DIN2, the dual-polarized antenna elements 12 are connected to radio frequency interfaces DIN3 and DIN4, the dual-polarized antenna elements 13 are connected to radio frequency interfaces DIN5 and DIN6, and the dual-polarized antenna elements 14 are connected to radio frequency interfaces DIN7 and DIN8. At least two couplers (for example, directional couplers) are disposed on a calibration signal circuit between two radio frequency interfaces of each group of dual-polarized antenna elements. For example, four couplers 11a, 11b, 11c, and 11d are disposed on a calibration signal circuit between the radio frequency interfaces DIN1 and DIN2, two couplers 12a and 12c are disposed on a calibration signal circuit between the radio frequency interfaces DIN3 and DIN4, two couplers 13a and 13c are disposed on a calibration signal circuit between the radio frequency interfaces DIN5 and DIN6, and two couplers 14a and 14c are disposed on a calibration signal circuit between the radio frequency interfaces DIN7 and DIN8. Effects of the couplers are classified into two types. One type is to couple the calibration signal from the main feed circuit to the calibration signal circuit, and the other type is to couple the calibration signal from the calibration signal circuit to the main feed circuit. Several combiners are disposed between two adjacent groups of dual-polarized antenna elements. In this embodiment, the switch 53 is disposed on the main feed circuit, and the switch 53 has three implementations. To be specific, when the switch is a space switch, the space switch isolates the calibration signal from the signal on the main feed circuit by turning off the main feed circuit. Alternatively, when the switch is a time switch, the time switch isolates the calibration signal from the signal on the main feed circuit by increasing a delay of the signal on the main feed circuit. Alternatively, when the switch is a frequency switch, the frequency switch isolates the calibration signal from the signal on the main feed circuit by changing a frequency of the signal on the main feed circuit.

As shown in FIG. 3, two radio frequency channels connected to the first interfaces (DIN2 and DIN4) are calibrated as an example, and DIN1 is the second interface. The calibration signal is received by DIN2, and a calibration signal circuit through which the calibration signal passes includes A2+C2+CC+A1. The calibration signal is coupled to C2 by the coupler 11a after passing through A2, is coupled to A1 by the coupler 11b after passing through the combiner and then passing through CC, and finally reaches DIN1. The signal on the main feed circuit is received by DIN2, and a main feed circuit through which the signal on the main feed circuit passes includes A2+B2+U2+B1+A1. The signal on the main feed circuit continues to pass upward through B2 after passing through A2, and then reaches DIN1 along B1 and A1 after passing through the dual-polarized antenna elements 11 (namely, U2). The calibration signal is received by DIN4, and a calibration signal circuit through which the calibration signal passes includes A4+C4+CC+A1. The calibration signal is coupled to C4 by the coupler 12a after passing through A4, is coupled to A1 by the coupler 11b after passing through the combiner and then passing through CC, and finally reaches DIN1. The signal on the main feed circuit is received by DIN4, and a main feed circuit through which the signal on the main feed circuit passes includes A4+B4+U4+U2+B1+A1. The signal on the main feed circuit continues to pass upward through B4 after passing through A4, and then reaches DIN1 along B1 and A1 after passing through the dual-polarized antenna elements 12 (namely, U4) and 11 (namely, U2). It can be seen that all the signals on the main feed circuit sent from DIN2 and DIN4 pass through B1. Therefore, the switch 53 is disposed at B1. When the switch is a space switch, the space switch isolates the calibration signal from the signal on the main feed circuit by turning off the main feed circuit at B1, so that the calibration signal reaches DIN1 first. Alternatively, when the switch is a time switch, the time switch isolates the calibration signal from the signal on the main feed circuit by increasing a delay of the signal on the main feed circuit, so that the calibration signal reaches DIN1 first. Alternatively, when the switch is a frequency switch, the frequency switch isolates the calibration signal from the signal on the main feed circuit by changing a frequency of the signal on the main feed circuit, so that the calibration signal and the signal on the main feed circuit can be easily distinguished from the signal received from DIN1.

It can be learned that, in this application, by adding the switch to the main feed circuit in the feed network between the antenna and the RRU, other radio frequency channels in the antenna are calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

Figure 4:
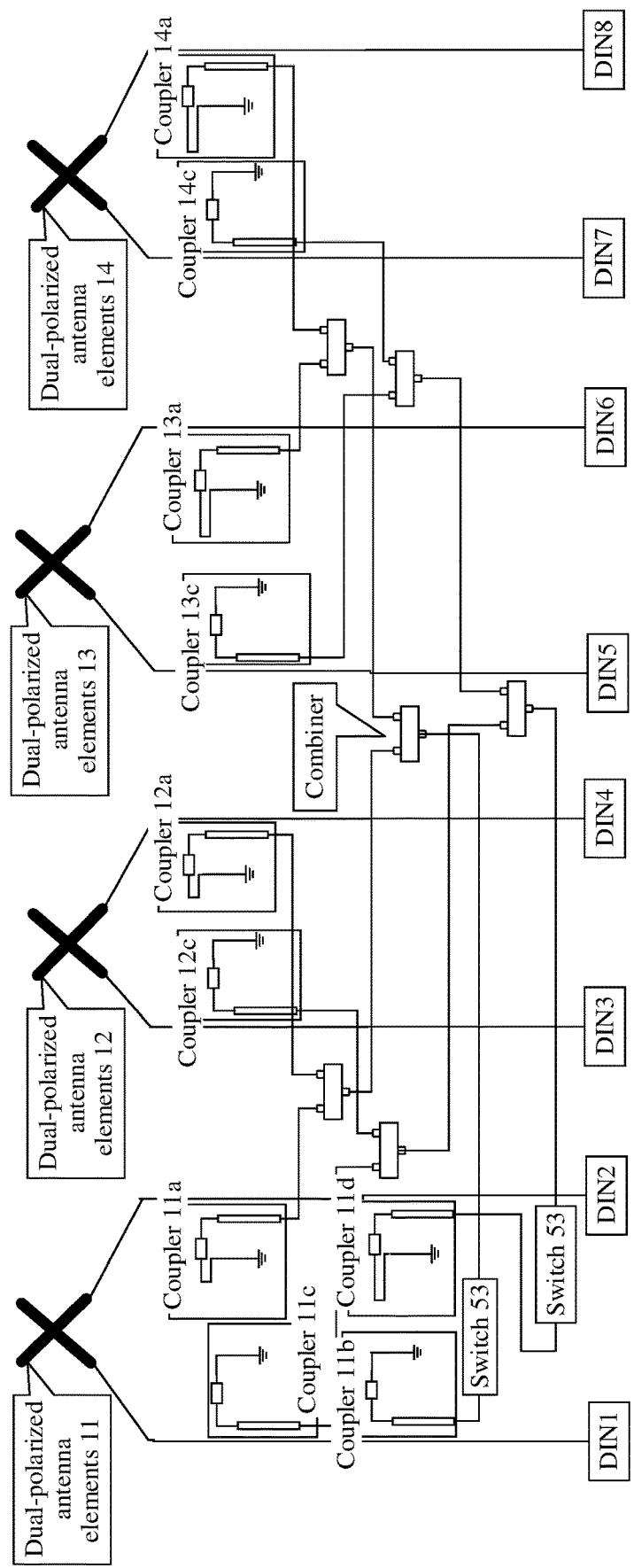
FIG. 4 and FIG. 5 are schematic structural diagrams of Embodiment 3 of an antenna according to this application.
Figure 5:
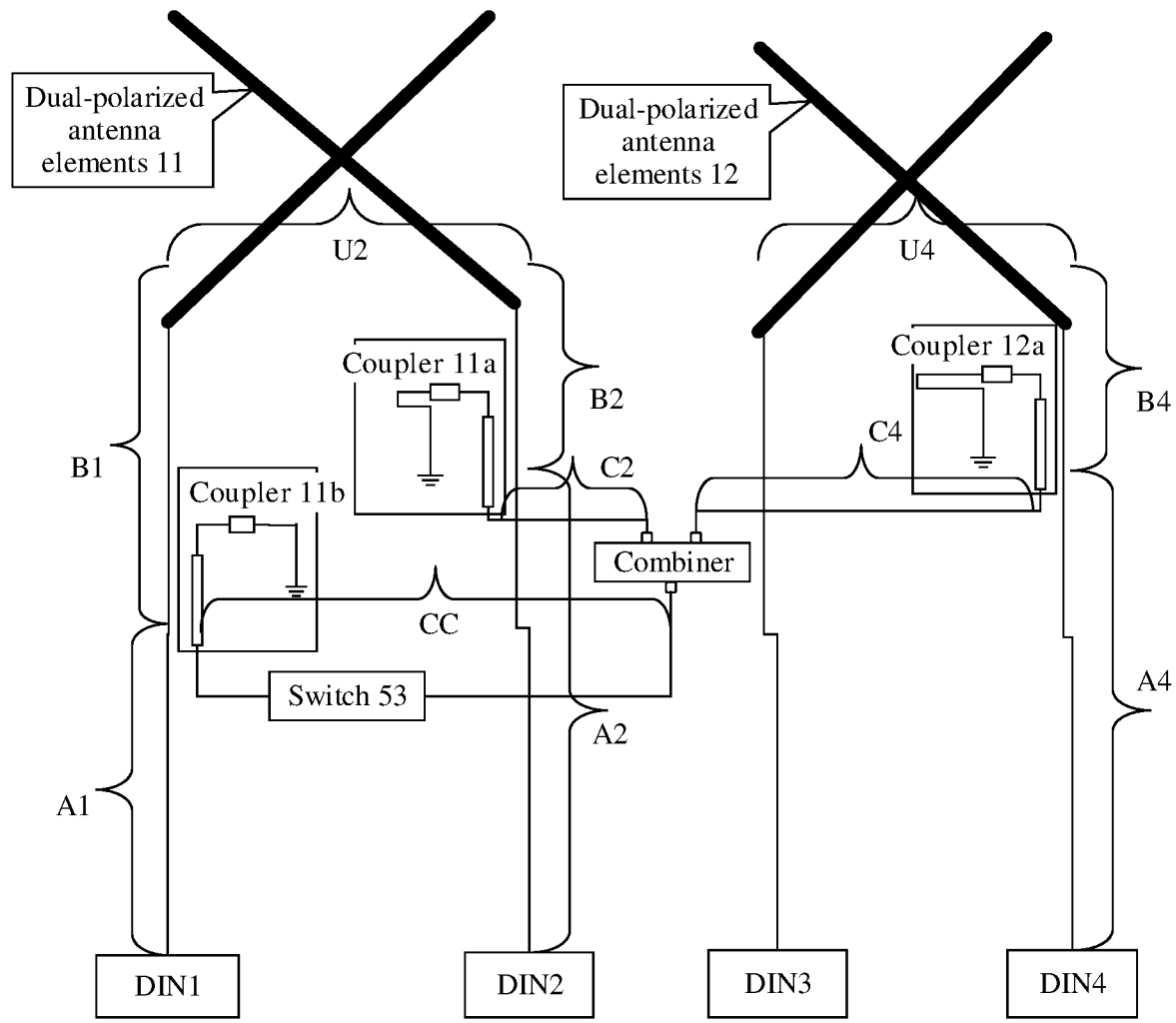

FIG. 4 and FIG. 5 are schematic structural diagrams of Embodiment 3 of an antenna according to this application. As shown in FIG. 4, this application provides an antenna, including four groups of dual-polarized antenna elements, and each group of dual-polarized antenna elements is connected to two radio frequency interfaces. To be specific, the dual-polarized antenna elements 11 are connected to radio frequency interfaces DIN1 and DIN2, the dual-polarized antenna elements 12 are connected to radio frequency interfaces DIN3 and DIN4, the dual-polarized antenna elements 13 are connected to radio frequency interfaces DIN5 and DIN6, and the dual-polarized antenna elements 14 are connected to radio frequency interfaces DIN7 and DIN8. At least two couplers (for example, directional couplers) are disposed on a calibration signal circuit between two radio frequency interfaces of each group of dual-polarized antenna elements. For example, four couplers 11a, 11b, 11c, and 11d are disposed on a calibration signal circuit between the radio frequency interfaces DIN1 and DIN2, two couplers 12a and 12c are disposed on a calibration signal circuit between the radio frequency interfaces DIN3 and DIN4, two couplers 13a and 13c are disposed on a calibration signal circuit between the radio frequency interfaces DIN5 and DIN6, and two couplers 14a and 14c are disposed on a calibration signal circuit between the radio frequency interfaces DIN7 and DIN8. Effects of the couplers are classified into two types. One type is to couple the calibration signal from the main feed circuit to the calibration signal circuit, and the other type is to couple the calibration signal from the calibration signal circuit to the main feed circuit. Several combiners are disposed between two adjacent groups of dual-polarized antenna elements. In this embodiment, the switch 53 is disposed on the calibration signal circuit, and the switch 53 has three implementations. To be specific, when the switch is a space switch, the space switch first turns off the calibration signal circuit to obtain the signal on the main feed circuit, then connects to the calibration signal circuit to obtain a mixed signal of the calibration signal and the signal on the main feed circuit, and finally isolates the calibration signal from the signal on the main feed circuit by using the mixed signal and the signal on the main feed circuit. Alternatively, when the switch is a time switch, the time switch isolates the calibration signal from the signal on the main feed circuit by increasing a delay of the calibration signal. Alternatively, when the switch is a frequency switch, the frequency switch isolates the calibration signal from the signal on the main feed circuit by changing a frequency of the calibration signal.

As shown in FIG. 5, two radio frequency channels connected to the first interfaces (DIN2 and DIN4) are calibrated as an example, and DIN1 is the second interface. The calibration signal is received by DIN2, and a calibration signal circuit through which the calibration signal passes includes A2+C2+CC+A1. The calibration signal is coupled to C2 by the coupler 11a after passing through A2, is coupled to A1 by the coupler 11b after passing through the combiner and then passing through CC, and finally reaches DIN1. The signal on the main feed circuit is received by DIN2, and a main feed circuit through which the signal on the main feed circuit passes includes A2+B2+U2+B1+A1. The signal on the main feed circuit continues to pass upward through B2 after passing through A2, and then reaches DIN1 along B1 and A1 after passing through the dual-polarized antenna elements 11 (namely, U2). The calibration signal is received by DIN4, and a calibration signal circuit through which the calibration signal passes includes A4+C4+CC+A1. The calibration signal is coupled to C4 by the coupler 12a after passing through A4, is coupled to A1 by the coupler 11b after passing through the combiner and then passing through CC, and finally reaches DIN1. The signal on the main feed circuit is received by DIN4, and a main feed circuit through which the signal on the main feed circuit passes includes A4+B4+U4+U2+B1+A1. The signal on the main feed circuit continues to pass upward through B4 after passing through A4, and then reaches DIN1 along B1 and A1 after passing through the dual-polarized antenna elements 12 (namely, U4) and 11 (namely, U2). It can be seen that all the calibration signals sent from DIN2 and DIN4 pass through CC. Therefore, the switch 53 is disposed at CC. When the switch is a space switch, the space switch first turns off the calibration signal circuit at CC to obtain the signal on the main feed circuit, then connects to the calibration signal circuit at CC to obtain a mixed signal of the calibration signal and the signal on the main feed circuit, and finally removes the signal on the main feed circuit from the mixed signal, to obtain the calibration signal. Alternatively, when the switch is a time switch, the time switch isolates the calibration signal from the signal on the main feed circuit by increasing a delay of the calibration signal, so that the calibration signal reaches DIN1 late. Alternatively, when the switch is a frequency switch, the frequency switch isolates the calibration signal from the signal on the main feed circuit by changing a frequency of the calibration signal, so that the calibration signal and the signal on the main feed circuit can be easily distinguished from the signal received from DIN1.

It can be learned that, in this application, by adding the switch to the calibration signal circuit in the feed network between the antenna and the RRU, other radio frequency channels in the antenna are calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

Figure 6:
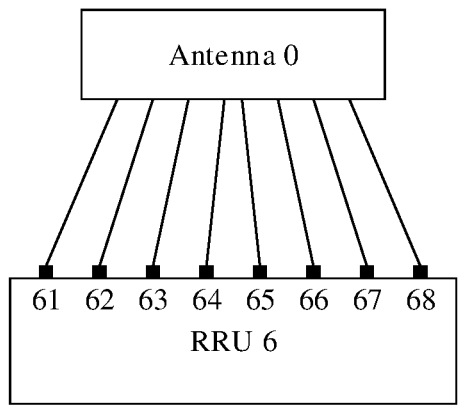
FIG. 6 and FIG. 7 are two schematic structural diagrams of an embodiment of a base station according to this application.
Figure 7:
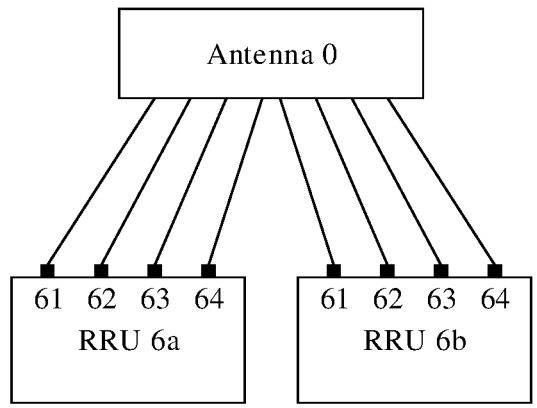

FIG. 6 and FIG. 7 are two schematic structural diagrams of an embodiment of a base station according to this application. As shown in FIG. 6, the base station includes an antenna 0 and an RRU 6, and the antenna 0 may use the structure shown in any one of the embodiments in FIG. 1 to FIG. 5. Based on the calibration principle of the radio frequency channel in the foregoing embodiments, as shown in FIG. 6, when there is one RRU 6, the RRU 6 has a total of eight radio frequency interfaces (61 to 68). The radio frequency interface 64 may be connected to a radio frequency interface (as a second interface) in the antenna 0 to receive calibration signals from the radio frequency interfaces 65 to 68 (respectively connected to four radio frequency interfaces (as first interfaces) in the antenna 0) and separately calibrate phases and amplitudes of the radio frequency interfaces 65 to 68 based on statuses of the calibration signals received by the radio frequency interface 64, so that the phases and the amplitudes of the radio frequency interfaces 65 to 68 are kept consistent. Alternatively, the radio frequency interface 65 may be connected to a radio frequency interface (as a second interface) in the antenna 0 to receive calibration signals from the radio frequency interfaces 61 to 64 (respectively connected to four radio frequency interfaces (as first interfaces) in the antenna 0) and separately calibrate phases and amplitudes of the radio frequency interfaces 61 to 64 based on statuses of the calibration signals received by the radio frequency interface 65, so that the phases and the amplitudes of the radio frequency interfaces 61 to 64 are kept consistent. As shown in FIG. 7, when there are two RRUs 6 (an RRU 6a and an RRU 6b), each RRU has four radio frequency interfaces (61 to 64). The radio frequency interface 64 of the RRU 6a may be connected to a radio frequency interface (as a second interface) in the antenna 0 to receive calibration signals from the radio frequency interfaces 61 to 64 (respectively connected to four radio frequency interfaces (as first interfaces) in the antenna 0) of the RRU 6b and separately calibrate phases and amplitudes of the radio frequency interfaces 61 to 64 of the RRU 6b based on statuses of the calibration signals received by the radio frequency interface 64 of the RRU 6a, so that the phases and the amplitudes of the radio frequency interfaces 61 to 64 are kept consistent. Alternatively, the radio frequency interface 61 on the RRU 6b may be connected to a radio frequency interface (as a second interface) in the antenna 0 to receive calibration signals from the radio frequency interfaces 61 to 64 (respectively connected to four radio frequency interfaces (as first interfaces) in the antenna 0) of the RRU 6a and separately calibrate phases and amplitudes of the radio frequency interfaces 61 to 64 of the RRU 6a based on statuses of the calibration signals received by the radio frequency interface 61 of the RRU 6b, so that the phases and the amplitudes of the radio frequency interfaces 61 to 64 are kept consistent.

It should be noted that, in the foregoing embodiments of this application, a radio frequency interface used as an example for sending and receiving a signal is not fixed, and may be any existing radio frequency interface between the antenna and the RRU. This is not limited in this application.

It can be learned that, in this application, the base station selects one of existing radio frequency channels between the antenna and the RRU to calibrate phases and amplitudes of other radio frequency channels without disposing a dedicated calibration port and channel for the antenna and the RRU, so that interference of the signal on the main feed circuit to the calibration signal is avoided, to obtain accurate calibration compensation information, and no additional installation and connection of a calibration channel are required, to be compatible with various RRU devices.

Figure 8:
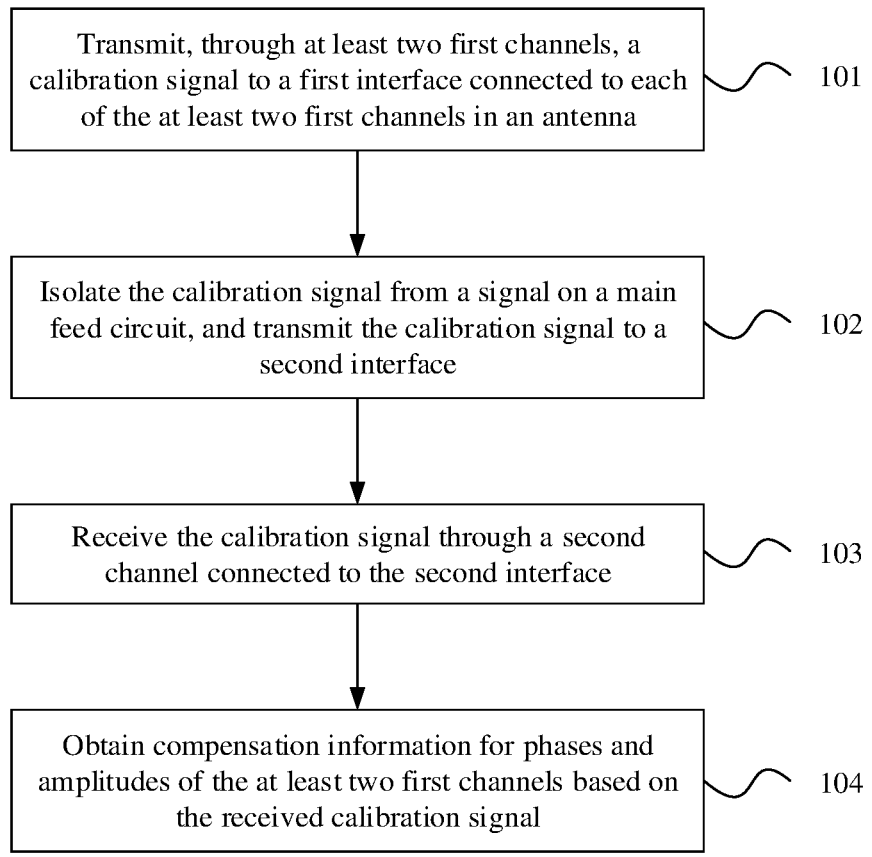
FIG. 8 is a flowchart of an embodiment of a radio frequency channel calibration method according to this application.

FIG. 8 is a flowchart of an embodiment of a radio frequency channel calibration method according to this application. As shown in FIG. 8, the method in this embodiment may be performed by the base station shown in FIG. 6 or FIG. 7, and the method may include the following steps.

Step 101: Transmit, through at least two first channels, a calibration signal to a first interface connected to each of the at least two first channels in an antenna.

The first channel is a to-be-calibrated radio frequency channel, for example, radio frequency channels respectively connected to the radio frequency interfaces 65 to 68 or the radio frequency interfaces 61 to 64 in FIG. 6, or for another example, radio frequency channels respectively connected to the radio frequency interfaces 61 to 64 of the RRU 6b or the radio frequency interfaces 61 to 64 of the RRU 6a in FIG. 7.

Step 102: Isolate the calibration signal from a signal on a main feed circuit, and transmit the calibration signal to a second interface.

For an implementation principle of this step, refer to any one of the embodiments shown in FIG. 1 to FIG. 5. Details are not described herein again.

Step 103: Receive the calibration signal through a second channel connected to the second interface.

The second channel is a radio frequency channel used as a calibration channel, and a radio frequency interface connected to the second channel in the antenna is the second interface, for example, a radio frequency interface on the antenna connected to the radio frequency interface 64 in FIG. 6, or a radio frequency interface on the antenna connected to the radio frequency interface 65, or for another example, a radio frequency interface on the antenna connected to the radio frequency interface 61 of RRU6b, or a radio frequency interface on the antenna connected to the radio frequency interface 64 of RRU6a in FIG. 7.

The first channel and the second channel may be separately radio frequency channels between different radio frequency interfaces on a same RRU and a radio frequency interface of the antenna, or may be radio frequency channels between radio frequency interfaces on different RRUs and a radio frequency interface of the antenna.

Step 104: Obtain compensation information for phases and amplitudes of the at least two first channels based on the received calibration signal.

After receiving the calibration signal corresponding to each first channel, the base station compensates for signals of the radio frequency channels to keep phases and amplitudes of the radio frequency channels consistent.

In this application, other radio frequency channels in the antenna are calibrated by using one existing radio frequency channel between the antenna and the RRU, so that phases and amplitudes of the other radio frequency channels are kept consistent, interference of the signal on the main feed circuit to the calibration signal is avoided, to obtain accurate calibration compensation information, and no additional installation and connection of a calibration channel are required, to be compatible with various RRU devices.

Figure 9:
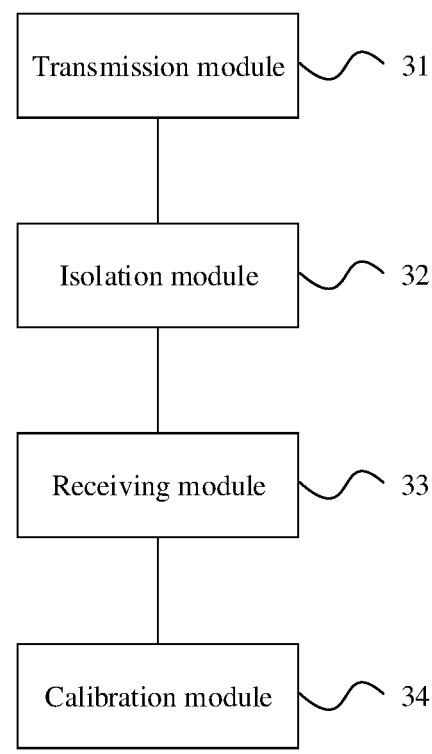
FIG. 9 is a schematic structural diagram of an embodiment of a radio frequency channel calibration apparatus according to this application.

FIG. 9 is a schematic structural diagram of an embodiment of a radio frequency channel calibration apparatus according to this application. As shown in FIG. 9, the apparatus includes a transmission module 31, an isolation module 32, a receiving module 33, and a calibration module 34. The transmission module 31 is configured to transmit, through at least two first channels, a calibration signal to a first interface connected to each of the at least two first channels in an antenna. The isolation module 32 is configured to isolate the calibration signal from a signal on a main feed circuit, and transmit the calibration signal to a second interface. The receiving module 33 is configured to receive the calibration signal through a second channel connected to the second interface. The calibration module 34 is configured to obtain compensation information for phases and amplitudes of the at least two first channels based on the received calibration signal.

The at least two first channels and the second channel are separately radio frequency channels between different radio frequency interfaces on a same RRU and a radio frequency interface of the antenna. Alternatively, the at least two first channels and the second channel are separately radio frequency channels between radio frequency interfaces on different RRUs and a radio frequency interface of the antenna.

The apparatus in this embodiment may be configured to execute the technical solution of the method embodiment shown in FIG. 8. Implementation principles and technical effects thereof are similar, and are not further described herein.

In a possible implementation, this application provides a computer-readable storage medium. The computer-readable storage medium stores instructions. When run on a computer, the instructions are used to perform the method in the embodiment shown in FIG. 8.

In a possible implementation, this application provides a computer program. When executed by a computer, the computer program is used to perform the method in the embodiment shown in FIG. 8.

Persons of ordinary skill in the art may understand that all or some of the steps in the foregoing method embodiments may be implemented by program-instructing related hardware. The program may be stored in a computer-readable storage medium. When the program is executed, the steps in the foregoing method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An antenna, comprising:
at least three radio frequency interfaces, wherein each radio frequency interface of the at least three radio frequency interfaces is connected to a radio frequency channel between the respective radio frequency interface and a remote radio unit (RRU); and
a feed network, comprising a main feed circuit, a calibration signal circuit, and a switch;
wherein a first radio frequency interface of the at least three radio frequency interfaces is configured to receive a first signal from the RRU, and transmit the first signal to a second radio frequency interface of the at least three radio frequency interfaces using the feed network;
wherein the second radio frequency interface is configured to send the first signal to the RRU;
wherein the calibration signal circuit is configured to transmit a calibration signal from the first radio frequency interface to the second radio frequency interface, wherein the calibration signal is used to calibrate a phase and an amplitude of a radio frequency channel connected to the first radio frequency interface; and
wherein the switch is configured to isolate the calibration signal from the first signal on the main feed circuit.

2. The antenna according to claim 1, wherein the switch is connected to the main feed circuit.

3. The antenna according to claim 2, wherein:
the switch is a space switch, and the space switch isolates the calibration signal from the first signal on the main feed circuit by turning off the main feed circuit; or
the switch is a time switch, and the time switch isolates the calibration signal from the first signal on the main feed circuit by increasing a delay of the first signal on the main feed circuit; or
the switch is a frequency switch, and the frequency switch isolates the calibration signal from the first signal on the main feed circuit by changing a frequency of the first signal on the main feed circuit.

4. The antenna according to claim 1, wherein the switch is connected to the calibration signal circuit.

5. The antenna according to claim 4, wherein:
the switch is a space switch, and the space switch is configured to turn off the calibration signal circuit to obtain the first signal on the main feed circuit, then to connect to the calibration signal circuit to obtain a mixed signal of the calibration signal and the first signal on the main feed circuit, and then to isolate the calibration signal from the first signal on the main feed circuit by using the mixed signal and the first signal on the main feed circuit; or
the switch is a time switch, and the time switch is configured to isolates the calibration signal from the first signal on the main feed circuit by increasing a delay of the calibration signal; or
the switch is a frequency switch, and the frequency switch is configured to isolate the calibration signal from the first signal on the main feed circuit by changing a frequency of the calibration signal.

6. The antenna according to claim 1, wherein at least two couplers are connected to the calibration signal circuit, a first coupler of the at least two couplers is configured to couple the calibration signal from the main feed circuit to the calibration signal circuit, and a second coupler of the at least two couplers is configured to couple the calibration signal from the calibration signal circuit to the main feed circuit.

7. A base station, comprising:
the antenna according to claim 1; and
the RRU; and
wherein at least three radio frequency channels are between the RRU and the antenna, wherein a first radio frequency channel of the at least three radio frequency channels is connected to a first interface in the antenna, and a second radio frequency channel of the at least three radio frequency channels is connected to a second interface in the antenna.

8. The base station according to claim 7, wherein:
the base station comprises only one RRU, and the first radio frequency channel and the second radio frequency channel are separately connected to different radio frequency interfaces of the only one RRU; or
the base station comprises at least two RRUs, and the first radio frequency channel and the second radio frequency channel are separately connected to different radio frequency interfaces of different RRUs of the at least two RRUs.

9. The antenna according to claim 1, wherein the feed network is disposed among the at least three radio frequency interfaces.

10. A method, comprising:
transmitting, through at least two first channels, a calibration signal to a first interface of an antenna, the first interface being connected to each of the at least two first channels;

isolating the calibration signal from a first signal on a main feed circuit, and transmitting the calibration signal to a second interface of the antenna;

receiving the calibration signal through a second channel connected to the second interface; and obtaining compensation information for phases and amplitudes of the at least two first channels based on the received calibration signal.

11. The method according to claim 10, wherein the at least two first channels and the second channel are radio frequency channels between different radio frequency interfaces on a same remote radio unit (RRU) and radio frequency interfaces of the antenna.

12. The method according to claim 10, wherein the at least two first channels and the second channel are radio frequency channels between radio frequency interfaces on different remote radio units (RRUs) and radio frequency interfaces of the antenna.

13. An apparatus, comprising:
at least one processor;
a non-transitory computer readable medium storing a program executable by the at least one processor, the program including instructions for:

transmitting, through at least two first channels, a calibration signal to a first interface of an antenna, the antenna being connected to each of the at least two first channels;

isolating the calibration signal from a first signal on a main feed circuit, and transmitting the calibration signal to a second interface of the antenna;

receiving the calibration signal through a second channel connected to the second interface; and obtaining compensation information for phases and amplitudes of the at least two first channels based on the received calibration signal.

14. The apparatus according to claim 13, wherein the at least two first channels and the second channel are radio frequency channels between different radio frequency interfaces on a same remote radio unit (RRU) and radio frequency interfaces of the antenna.

15. The apparatus according to claim 13, wherein the at least two first channels and the second channel are radio frequency channels between radio frequency interfaces on different remote radio units (RRUs) and radio frequency interfaces of the antenna.

* * * * *